US006984767B2

(12) United States Patent
Hunt et al.

(10) Patent No.: US 6,984,767 B2
(45) Date of Patent: Jan. 10, 2006

(54) SONICATION TREATMENT OF POLYCHLORINATED BIPHENYL CONTAMINATED MEDIA

(75) Inventors: Lorrie Hunt, Delta (CA); Jim McKinley, North Vancouver (CA); Rod McElroy, Vancouver (CA)

(73) Assignee: Sonic Environmental Solutions Inc., Vancouver (CA)

(*) Notice: Subject to any disclaimer, the term of this patent is extended or adjusted under 35 U.S.C. 154(b) by 0 days.

(21) Appl. No.: 10/511,878

(22) PCT Filed: Apr. 23, 2003

(86) PCT No.: PCT/CA03/00593

§ 371 (c)(1),
(2), (4) Date: Oct. 19, 2004

(87) PCT Pub. No.: WO03/090945

PCT Pub. Date: Nov. 6, 2003

(65) Prior Publication Data

US 2005/0165268 A1 Jul. 28, 2005

Related U.S. Application Data

(60) Provisional application No. 60/374,512, filed on Apr. 23, 2002.

(51) Int. Cl.
*B09C 1/02* (2006.01)
*A62D 3/00* (2006.01)

(52) U.S. Cl. .............. 588/314; 422/127; 422/198; 588/406; 588/900

(58) Field of Classification Search .............. 588/314, 588/406, 900; 422/127, 128, 900, 198
See application file for complete search history.

(56) References Cited

U.S. PATENT DOCUMENTS

| 4,151,067 A | | 4/1979 | Grow |
| 4,941,134 A | | 7/1990 | Nyberg et al. |
| 5,005,773 A | * | 4/1991 | Nyberg et al. ............ 241/30 |
| 5,228,921 A | * | 7/1993 | Peterson ............... 134/25.1 |
| 5,318,228 A | * | 6/1994 | Macas ................... 241/21 |
| 5,376,182 A | | 12/1994 | Everett et al. |
| 5,690,811 A | * | 11/1997 | Davis et al. ............ 208/428 |
| 6,049,021 A | | 4/2000 | Getman et al. |
| 6,061,383 A | * | 5/2000 | Katayama ............... 373/5 |

(Continued)

FOREIGN PATENT DOCUMENTS

JP 2002-66498 * 3/2002

(Continued)

OTHER PUBLICATIONS

Full English Translation of JP 2002-66498, published Mar. 5, 2002.*

(Continued)

*Primary Examiner*—Stanley S. Silverman
*Assistant Examiner*—Ardith E Hertzog
(74) *Attorney, Agent, or Firm*—Vermette & Co.; Clifford W. Vermette (57) ABSTRACT

The invention consists of a method for treating polychlorinated biphenyl (PCB) contaminated media by: a) combining the media with a fluid containing one or more liquid hydrocarbons to form a media/fluid mixture; b) sonicating the mixture at audio frequency to extract PCB from the media into the fluid; and c) treating the fluid with sodium-containing alkali metal. The method may include additional steps to reduce the size of the media. Alternatively, the fluid can be decanted from the media after sonication and treated separately with sodium-containing alkali metal.

33 Claims, 4 Drawing Sheets

U.S. PATENT DOCUMENTS

2003/0036672 A1 * 2/2003 Gonzalez et al. .......... 588/207

FOREIGN PATENT DOCUMENTS

| WO | WO 97/14765 A | 4/1997 |
| WO | WO 02/22252 A | 3/2002 |

OTHER PUBLICATIONS

D. Krefting, et al. "High-speed observation of acoustic cavitation erosion in multibubble systems", Ultrasonics Sonochemistry, vol. 11, 2004, pp. 119-123.*

* cited by examiner

SONICATION TREATMENT OF POLYCHLORINATED BIPHENYL CONTAMINATED MEDIA

This application claims the benefit of U.S. Provisional Patent Application 60/374,512, filed on Apr. 23, 2002.

FIELD OF INVENTION

This invention is related to treatment of polychlorinated biphenyl ("PCBs") contaminated media and in particular to extraction of PCBs from contaminated soil into a fluid via sonication.

BACKGROUND OF INVENTION

The existence of large numbers of sites, with soil or other media such as ballast pitch/tar residue, extensively contaminated by polychlorinated biphenyls, hereinafter referred to as "PCBs", requires economical cost effective treatment methods. Although incineration has been shown capable of destroying PCBs, this form of PCB treatment has been implicated in chlorinated dioxin and dibenzofuran emissions and has been banned for use in certain countries such as Australia and Japan (Costner, Pat et al., 1998, "Technical Criteria for the Destruction of Stockpiled Persistent Organic Pollutants", Third Meeting of the Intersessional Group Intergovernmental Forum on Chemical Safety, Yokohama, Japan, Dec. 1–4, 1998; see also "Survey of Currently Available Non-Incineration PCB Destruction Technologies", United Nations Environment Programme, August 2000). There is a need for cost effective PCB decontamination methods for a variety of media, including soil and ballast residue, which do not involve PCB incineration.

PCBs, (approximate formula $C_{12}H_5Cl_5$) were manufactured under various trade names (e.g. Arochlor 1254, CAS No. 11097-69-1) and extensively used in electrical equipment, particularly as a dielectric in transformers and capacitors.

Prior to recognition of their environmentally hazardous nature, PCBs were also used in unconfined applications such as pesticide extenders and fire retardants (see MSDS for Arochlor 1254). In the course of industrial operations, spillage has resulted in significant contamination of soils adjacent to facilities involved in the manufacture and repair of electrical equipment as well as other operations using PCBs.

Another significant source of PCB contaminated materials is fluorescent light ballasts manufactured before 1980. Ballasts are regulated in the US Code of Federal Regulations (CFR) Part 761. A summary is presented in a Minnesota Pollution Control Agency Publication (www.pca.state.mn.us/waste/pubs/4_48f.pdf). PCB ballasts can be processed for metal recovery leaving a concentrated PCB residue.

Currently, industrial materials such as transformer oils can be treated by commercial operation to chemically destroy PCBs by sodium reduction. This allows the valuable base transformer oil to be re-used. For solid wastes, however, the currently available options for management/disposal are principally permanent storage in a secure landfill (e.g. in the United States) or incineration in a suitably controlled, monitored and permitted waste incinerator. The former operation results in a permanent retained liability by the waste generator. Incineration is costly and entails risk of atmospheric emissions.

Regulations regarding classification and acceptable disposal of PCB solid wastes vary by jurisdiction. Some representative regulations for British Columbia, Canada are:

| Disposal Method | Allowable PCB level in mg/Kg waste |
| --- | --- |
| Incinerator or secure fill | >50 |
| Industrial fill | >2 and <50 |
| General Landfill | <2 |

Getman et al. in U.S. Pat. No. 6,049,021 describe remediation of soil contaminated with PCBs. This patent describes the destruction of PCBs in soil using a variety of methods combining the following basic elements:

PCB extraction of soil by liquid ammonia dissolution of sodium metal into PCB-contaminated liquid ammonia destruction of PCB in liquid ammonia by dissolved sodium metal Although this technique clearly shows high destruction of PCB in soil it suffers from the following problems:

Need to refrigerate ammonia with soil with stirring before addition of sodium metal (see Example 4)

Need to operate with hazardous pressurized anhydrous ammonia gas in a stirred vessel (see Example 2)

Extremely high ammonia dose on soil e.g. 9 litres ammonia per kilogram of soil (see Example 3)

Generation of ammonia containing residual wastes "filtrates" (see Example 2)

Awkward temperature cycling between 0° C. and 20 to 40° C. (see Example 4) or −78° C. (see Example 3)

Awkward, time consuming, multiple soil extractions with ammonia before addition of sodium metal (see Example 4)

U.S. Pat. No. 5,228,921 issued to Peterson describes a method for extracting organohalogens from organohalogen contaminated solids such as PCBs from PCB contaminated soils. U.S. Pat. No. 5,376,182 issued to Everett et al. describes PCB extraction from PCB contaminated soil with ultrasound at 10 to 60 kilohertz frequency. Although these extraction methods successfully remove PCBs from soil, they do not destroy the PCBs.

PCT application WO 02/22252 of Collings describes ultrasonic destruction of PCBs in a one-step process. However, PCB destruction efficiency is low (e.g. 75% lines 20 to 25, page 10).

Eco Logic at web page www.eco-logic-intl.com in a brochure dated April 2001 and entitled "The TORBED/GPCR combination for Soil, Sediment and Sludge Treatment" describe a multi-step process for removal and destruction of PCBs in solids such as soils as follows:

1. High temperature (e.g. 600° C.) thermal desorption of PCBs from soils by volatilization
2. High temperature (e.g. 875° C.) gas phase reduction of volatilized PCB exhaust gas from 1. with a reducing gas such as hydrogen
3. Scrubbing of exhaust gas from 2. to recover toxic and/or corrosive gases such as hydrogen chloride produced from reduction of PCBs
4. Compression and/or storage of scrubbed exhaust gas from 3
5. Incineration and/or recycling of scrubbed exhaust gas from 4 to steps 1 and/or 2 respectively Although the Eco Logic method clearly destroys PCBs in soils it suffers from the following problems:

1. Generation of toxic and/or corrosive exhaust gas (e.g. hydrogen chloride) and spent scrubber solutions 2. Use of potentially explosive hydrogen gas at high temperature
3. Five or more processing steps
4. Two energy intensive, high temperature processing steps U.S. Pat. No. 4,941,134 issued to Nyberg et al. describes a sonic generator for the transmission of energy into fluid mediums using a "resonating bar" or probe (see FIG. 6A). U.S. Pat. No. 5,005,773 issued to Nyberg et al. describes a method for using this sonic generator in combination with grinding media to effect pulverization of solids contained in a grinding chamber mounted "axially" to the resonant member (see FIG. 9a and lines 25 to 26 plus 33 to 34 on page 5).

U.S. Published Patent application No. 2003/0036672 and Canadian Patent application No. 2,316,409 to Sim et al. describes the destruction of PCBs in ballast tar/pitch using alkali dispersions of sodium, lithium or potassium. This technology suffers from the following serious disadvantages:

Use of sodium dispersions that are 2 to 4 times more expensive than sodium metal ingots and hazardous to use due to their speed of reaction with parasitic agents such as water and certain oxygen containing organics (e.g. phenolics or carboxylic acids) in the tar/pitch Use of cosolvents (e.g. iso-octane, methanol and isopropanol—see claim 8) which boil or evaporate at suggested processing temperatures e.g. 90° C. (page 2 section [0018] of US application) resulting in wasted solvent and or safety issues due to toxic or flammable vapour discharge No drying of tar/pitch to remove entrained moisture parasitic to use of alkali such as sodium and resulting in serious potential safety hazards such as hydrogen discharge from the reaction of alkali metal with water at levels in air above its explosive limit Lack of inerting at the start of alkali contact with the PCB contaminated media resulting in a potential safety hazard due to potential hydrogen discharge above its explosive limit Contradictory teachings with the applications—page 1 section [0012] of the US application states that the teachings of copending Canadian application 2,316,409 "are incorporated herein in their entirety". Claim 1 of the Canadian application specifies the operation "below flash point of said contents". The flash point of methanol, iso-octane and isopropanol suggested in claim 8 of the US application, are according to the Merck Index 12° C., −12° C. and 11.7° C. respectively which are 78° C. lower than the recommended processing temperature.

There is a need for a low temperature process, especially a process suitable for mobile processing of media at the site of contamination, which can quickly extract and efficiently destroy PCBs in a minimum number of processing steps to reduce the size of equipment and its cost.

SUMMARY OF THE INVENTION

The present invention provides a method for extraction and low temperature chemical destruction of PCBs from media, including solid wastes, such as soils, ballasts, and scrap from dismantling of PCB contaminated electrical equipment.

The treatment process for PCB contaminated solid wastes comprises the following key unit operations:

Preparation of a mixture of PCB contaminated media such as soil solids, preferably with air-drying, sieving or comminution, and a fluid extractant containing a liquid hydrocarbon component in whole or part;

Intense agitation of the soil-fluid mixture (slurry) using audio frequency sonic mixing "sonication", resulting in extraction of PCBs into the hydrocarbon liquid containing fluid extractant. Such sonication devices come in two preferred types: sonicating probes in direct contact with fluids; and sonication of fluid containing vessels mounted axially to a resonating member but in the absence of grinding media;

Low temperature (e.g. 98° C. or higher) chemical destruction of PCBs, especially extracted PCBs, by contact/reaction with dispersed molten sodium containing alkali metal;

Separation of the hydrocarbon liquid containing fluid extractant phase from solids by a combination of decantation and froth flotation (before or after PCB destruction);

Recycling of the sodium containing alkali metal treated (low PCB) hydrocarbon containing fluid extractant phase to treat new PCB contaminated solid waste such as soil solids;

Within this sequence of operations, a key feature is use of audio frequency sonicators (such as in U.S. Pat. Nos. 4,941,134 and 5,005,773) to extract the PCB from the solid media into the extraction fluid. These machines have demonstrated large-scale processing capabilities and have shown their potential in over a dozen commercial applications. The defining feature of the sonic generators is their ability to apply very intense audio frequency vibrational energy to chambers mounted on each end of the vibrating bar or to fluid materials in direct contact with the bar.

BRIEF DESCRIPTION OF THE DRAWINGS

The invention itself both as to organization and method of operation, as well as additional objects and advantages thereof, will become readily apparent from the following detailed description when read in connection with the accompanying drawings.

DETAILED DESCRIPTION OF THE INVENTION

The present invention provides a method for extraction and low temperature chemical destruction of PCBs from media, including solid wastes, such as soils, ballasts, and scrap from dismantling of PCB contaminated electrical equipment.

The treatment process for PCB contaminated solid wastes comprises the following key unit operations:

Preparation of a mixture of PCB contaminated media such as soil solids, preferably with air-drying, sieving or comminution, and a fluid extractant containing a liquid hydrocarbon component in whole or part;

Intense agitation of the soil-fluid mixture (slurry) using proprietary audio frequency sonic mixing "sonication", resulting in extraction of PCBs into the hydrocarbon liquid containing fluid extractant.

Such sonication devices come in two preferred types: sonicating probes in direct contact with fluids; and sonication of fluid containing vessels mounted axially to a resonating member but in the absence of grinding media;

Low temperature (e.g. 98° C. or higher) chemical destruction of PCBS, especially extracted PCBs, by contact/reaction with molten sodium containing alkali metal;

Separation of the hydrocarbon liquid containing fluid extractant phase from solids by a combination of decantation and froth flotation (before or after PCB destruction);

Recycling of the sodium containing alkali metal treated (low PCB) hydrocarbon containing fluid extractant phase to treat new PCB contaminated solid waste such as soil solids;

The core sonic generator technology involves the conversion of electric power, via sequentially activated magnets, to resonant vibrational energy in a steel bar. Vibrational energy from the bar is transmitted to the attached 'cells' through which fluid materials can be pumped and be subjected to very intense audio frequency agitation ("sonication"). The vigorous sonication is used in the current process to enhance PCB extraction and enhance the rates of chemical reaction of extracted PCBs with molten sodium containing alkali metal. The sonic generator machines are large (beyond bench and lab scale) low frequency sonic generators that have sufficient processing capacity for commercial applications. The sonic generators are readily transportable and require no anchoring once on site.

Heat generation testwork indicates specific energy inputs for the 20 kW generator ranging upwards from 90 kW/m$^3$ of reactor volume (450 Horsepower/1,000 US gallons). This range of power input is at least an order of magnitude (10 times) greater than is achieved by energy intensive industrial mixing systems such as flotation cells. When the power input is as effective as in conventional mixing then the advantage of the generator is in proportion to the energy intensity. The high energy intensity is advantageous for chemical process operations where very intense mixing via sonication improves the selectivity or efficiency of the desired chemical reaction.

Figure 3:
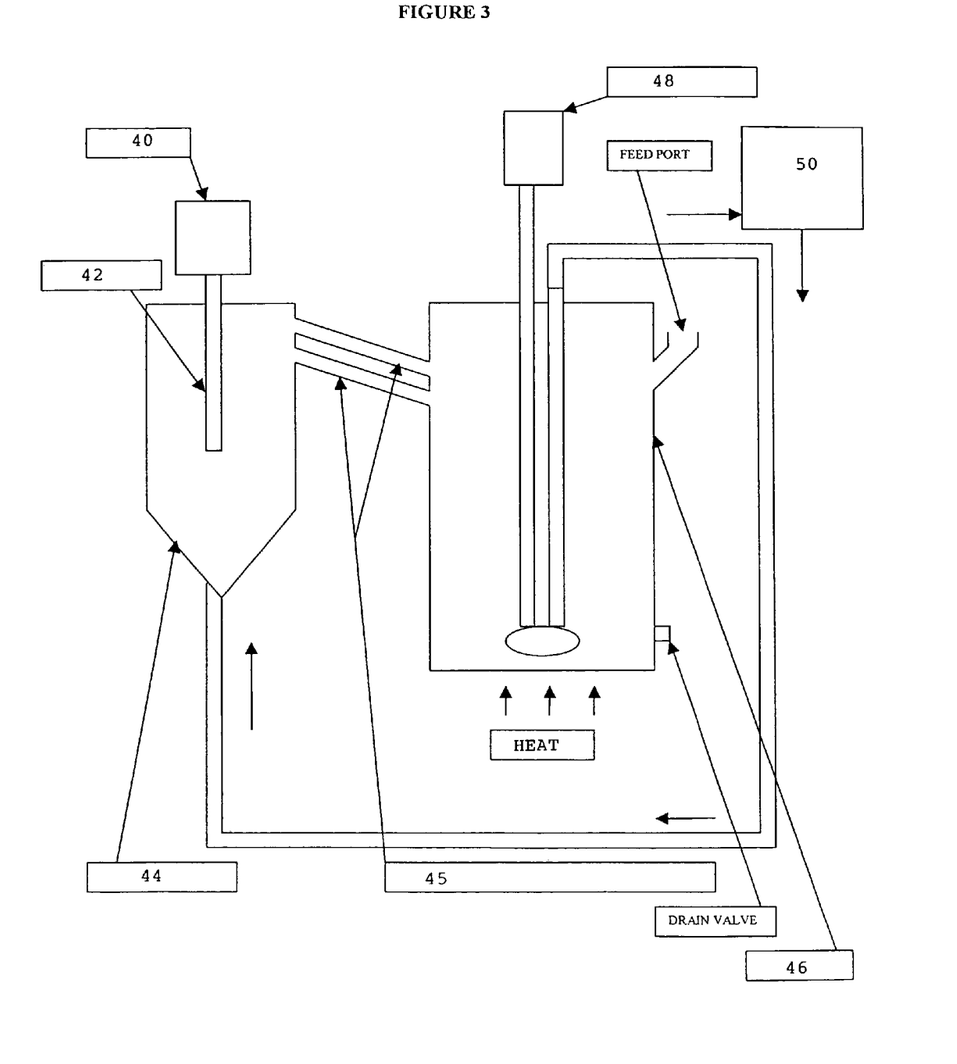
FIG. 3 is a schematic for an extraction system using a 5 kW vertical sonicator.
Figure 4:
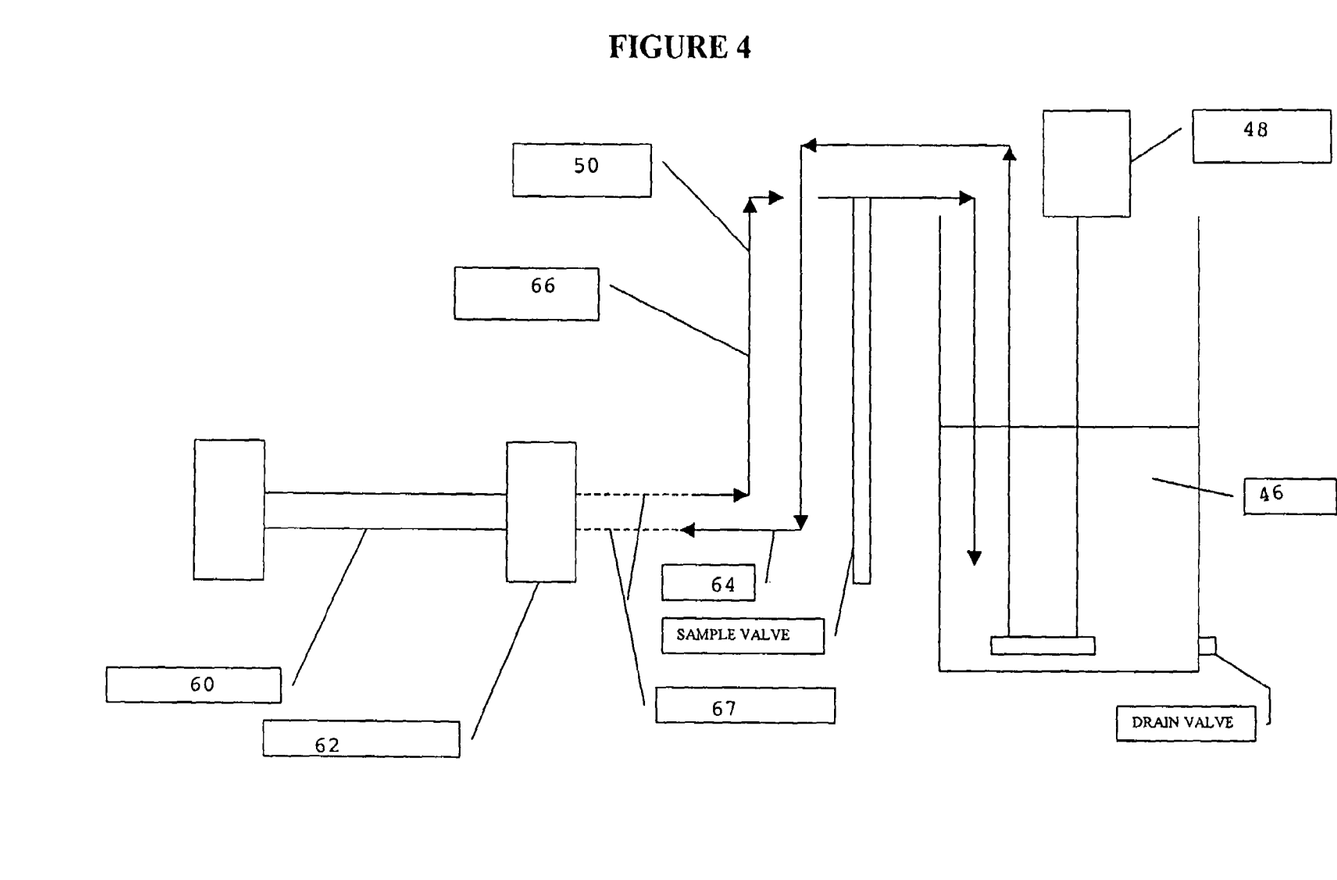
FIG. 4 is a schematic for an extraction system using a 75 kW sonicator.

The sonic generators have demonstrated the ability to sonicate fluids and/or liquid-solids mixtures (slurries) at commercially acceptable flow rates. The current prototype machines generate in the low frequency range from 100 to 500 Hz. at power ratings of 75 and 20 kW (horizontal type as illustrated in FIG. 4) and 5 kW for a vertical probe generator with a single drive (illustrated in FIG. 3).

Figure 1:
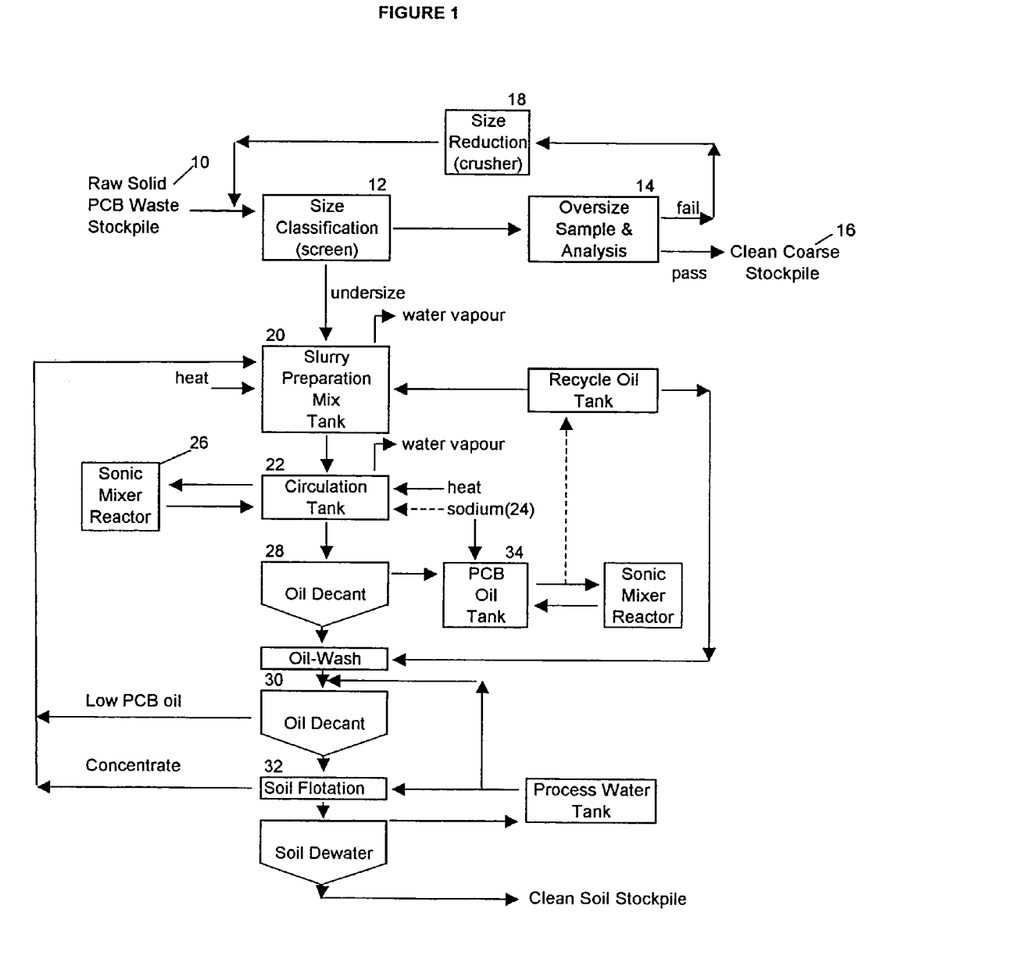
FIG. 1 is a process schematic for PCB extraction using a liquid hydrocarbon extraction fluid.

With reference to FIG. 1, a typical sequence of operation for treatment of PCB contaminated media such as solids including soil and ballast is as follows:

Contaminated solids (10) from a source or stockpile are classified by size (12) using screens or other conventional technology. The objectives of this step are to ensure that the solids can be pumped when mixed with the hydrocarbon liquid containing extractant fluid and that the solids are small enough to be extracted within a desired time.

Oversize material (14) may in some cases—for example coarse rock in soil—be clean enough for disposal (16) or may be size reduced (crushed) (18) and returned to the size classifier (12);

Feed solids are mixed (20) with the fluid extractant containing a hydrocarbon liquid such as kerosene which has an atmospheric boiling point above 120° C. to provide a pumpable solid-fluid mixture (slurry) with a typical solids content of 35–70% by weight;

The prepared slurry passes via a pump or gravity flow to a heated reservoir/circulation tank (22) where its temperature is raised above 100° C. Heating serves two purposes: removal of free moisture, which would otherwise react with sodium containing alkali (key process reagent) and establishing a process temperature above the melting point (98° C.) of sodium containing alkali metal so that the alkali metal reagent is molten when it is subjected to intense sonication. This facilitates fine dispersion of the sodium containing alkali and fast reaction with PCBs which are dissolved in the process fluid.

When the slurry is correctly heated and dried, sodium metal (24) is added as liquid or solid lumps that melt. The resulting 3 phase (liquid—molten metal—solids) mixture is pumped through the reaction chamber(s) of a sonic generator (26) where intense mixing facilitates extraction of PCBs and concurrent destruction by reaction of the organochlorine with sodium to form sodium chloride (Aromatic-Cl+Na→NaCl+Aromatic; Titration of water soluble NaCl is a standard method for PCB analysis after Na reduction).

On completion of the PCB extraction and PCB destruction reactions, the slurry is treated to separate the hydrocarbon containing fluid extractant from the cleaned soil. This is achieved by combination of decantation (28, 30) and froth flotation (32). Froth flotation is a widely practiced mineral processing technique (e.g. Taggart, Arthur F., "Handbook of Mineral Dressing", John Wiley and Sons Inc. (New York), 1945 or Gaudin, A. M., "Flotation", McGraw-Hill Book Co. Inc. (New York), 1957) in which oleophilic (oil or hydrocarbon wettable materials and oil or hydrocarbon containing fluid) materials are extracted by passage of air bubbles through a fluid mixture (slurry). The flotation process is typically optimized for a particular feed material by adjustment of solution conditions (pH, temperature) and addition of small quantities of chemicals such as frothers, which generate a stable froth layer for removal of oleophilic materials.

A process option, also shown in FIG. 1, is to separate the operations of PCB extraction and destruction. Data presented in the examples indicates that this approach may be favoured when the PCB solids contain other materials which react with sodium ("parasitic sodium consumption") for example carboxylates or phenolics. To the extent that parasitic consumers are not soluble in the hydrocarbon containing liquid extractant, excess sodium containing alkali metal consumption may be reduced by separating (34) the extractant from the (extracted) solids prior to the sodium containing alkali metal treatment.

A further option, not shown in FIG. 1, is to omit the flotation stage. This option is not typically useful for soils unless a local market (e.g. asphaltic pavement) is available for the extractant oil wetted solids. However, for wastes such as electrical ballasts and capacitors which have a high hydrocarbon (tar) content, simple removal of process fluid by decantation and/or filtration can result in a conveniently and safely disposable solid.

Figure 2:
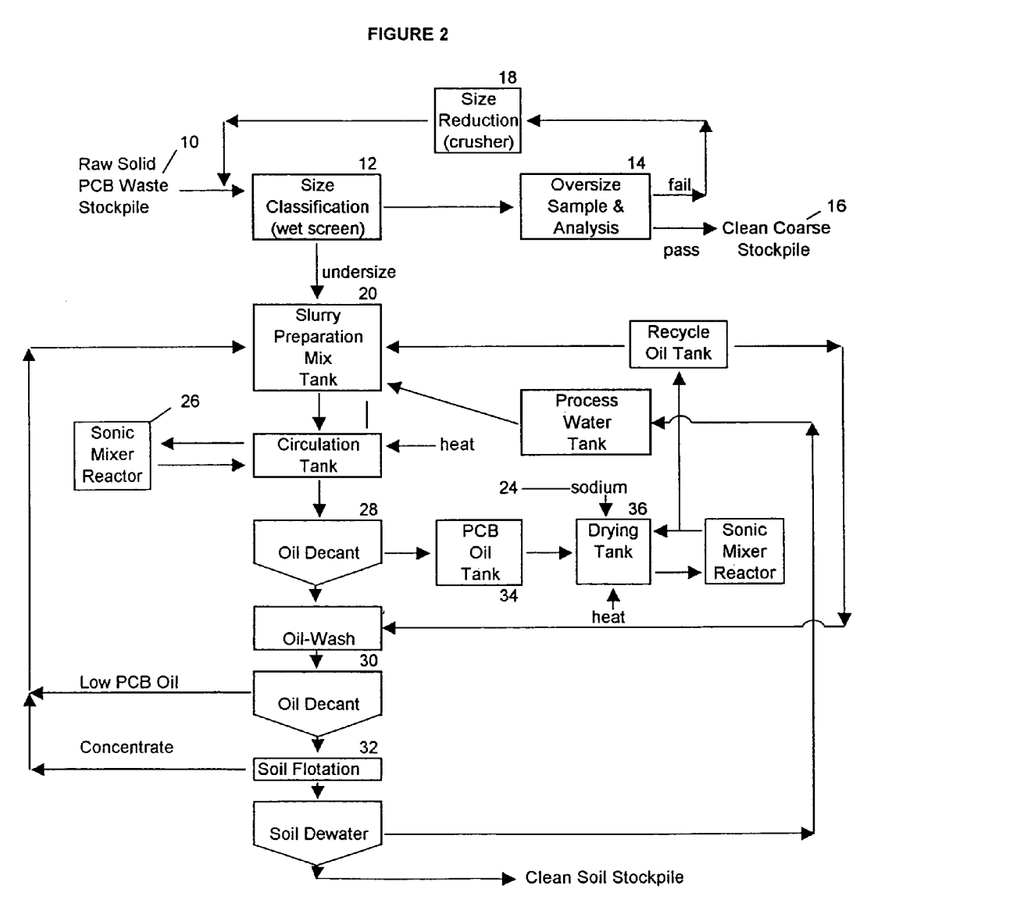
FIG. 2 is a process schematic for PCB extraction using a combination of water and liquid hydrocarbon extraction fluid.

A similar alternative method is shown in FIG. 2. In this case, the fluid extractant is a mixture of water and a hydrocarbon containing liquid such as kerosene. The water content of the fluid should be sufficient to make a pumpable slurry when mixed with the solid for example 35–70% solids/30–65% water, with hydrocarbon containing liquid added in the range of 10–30 wt % of the soil.

The key differences between this approach and that of FIG. 1 are:

PCB extraction is conducted at a temperature below 100° C., preferably in the range of 80–98° C.;

Hydrocarbon containing liquid, containing extracted PCB, is separated from water and solids by decantation (28, 34), then heated (36) to a temperature above 100° C. for drying and subsequent sonication with sodium metal containing alkali (24).

Typically, the flotation stage (32) is required for recovery of hydrocarbon containing liquid from the extracted solids.

Use of water/hydrocarbon containing liquid extraction may be favoured when the contaminated solids include a significant proportion of fine grained materials such as silt or clay which may be difficult to separate from an oil phase once oil wetting occurs. Use of a water/hydrocarbon containing liquid mixture for PCB extraction largely avoids wetting of naturally hydrophilic solids by the hydrocarbon containing liquid portion of the fluid. This can be optimized by adjustment of the aqueous phase pH.

The following non-limiting examples illustrate the effectiveness of the invention:

EXAMPLE 1

One-Stage Batch Treatment of Soil in Single Vessel with Axial Sonication

A sample of PCB contaminated soil was obtained from a secure landfill at a Greater Vancouver, B.C., Canada location. This fill was constructed for the sole purpose of containing high level (>50 ppm) PCB contaminated soil and debris from demolition and cleanup of an electrical manufacturing plant site. Excavated material was sampled for analysis and all material containing>50 mg/Kg (ppm) of PCBs was placed in the double lined, covered fill. The sample of approximately 20 Kg was processed initially over a −6 mesh shaking screen to separate the sieved soil from coarse cobble rock, concrete, steel, and debris.

The soil (−6 mesh) was air dried, and then split using a riffle splitter (a device for obtaining representative sub-samples of solid materials, see Taggart) to provide representative samples for testwork and analysis.

A 2-kilogram sub-sample of the soil was then mixed with 0.8 L of kerosene and placed in a cylindrical steel reaction chamber. Sodium metal in the form of a 10 g block was added to the chamber prior to closure and the chamber was then mounted on the 20 kW sonic generator. The chamber incorporated a heating jacket which was partially filled with ethylene glycol antifreeze to facilitate heat transfer. The mounted chamber was then heated with a propane torch until a charge temperature (thermocouple measured) reached 100° C.

The vent valve on the chamber was then closed and the generator was run at 60% power, 430 Hz resonant frequency for two five-minute periods. After each interval, the vent valve was opened to release accumulated pressure. Temperature was maintained at >102° C. After 10 minutes of sonic mixing the chamber was dismounted, opened and the contents tested for residual sodium. There was none found, so a further 10 g of sodium was added and the test sequence repeated. Product samples were then taken for analysis as follows:

for solids, exhaustive Soxhlet extraction with hexane/acetone (50/50), followed by gas chromatography with an electron capture detector (GC-ECD)

for hydrocarbon containing liquid, dilution with hexane followed by GC-ECD for solids oil content, overnight air drying at 80° C. in a ventilated oven Results of PCB analyses were as follows:

| Sample | PCB content mg/Kg (solids) or mg/L (hydrocarbon containing liquid) |
| --- | --- |
| Untreated soil | 470 |
| Soil, first 10 minute test | 98 |
| Soil, second test (total time 20 min) | <2 |
| Hydrocarbon containing liquid (second test) | <2 |

The treated soil contained 15.5% hydrocarbon containing liquid by weight.

The results indicate the feasibility of soil contained PCBs destruction to <2 ppm by treatment with sodium in hydrocarbon containing liquid slurry under sonication.

For the GC-ECD analytical method on heterogeneous samples such as soil, the practical detection limit is 2 mg/Kg (ppm). To quantify the extent of the PCB removal in this initial successful test, the final treated soil was reanalyzed by:

Soxhlet extraction (hexane/acetone);

cleanup of extract by treatment over a Florisil absorption column to selectively remove polar and asphaltic components;

analysis of cleaned extract by Gas Chromatography/Mass Spectroscopy ("GC-MS") operated in the Selected Ion Mode ("SIM"). The GC-MS-SIM system differentiates between target and background response, permitting a detection limit of 0.4 ppm PCBs. By this method, the 30 minute treated sample contained<0.4 ppm PCBs.

EXAMPLE 2

Batch Treatment of Soil in Single Vessel with Axial Sonication

PCB-contaminated soil was air-dried and sieved to −6 mesh. Two kilograms of soil was combined with 0.6 litres kerosene and 45 grams of solid sodium metal in a 3.2 litre sonication vessel axially mounted to a 20 kilowatt (kW) sonic driver. The sealed sonication chamber was heated to 115° C. using heat from a propane torch to melt the sodium metal. The sonic chamber heating jacket was filled half-way with ethylene glycol antifreeze to aid in heat transfer to the sonication chamber ingredients. The sonication chamber was opened to sample soil after interval sonic mixing times of 1, 2, and 5 minutes. The presence of sodium was determined by addition of a few drops of water to the analytical sample and observation of effervescence from hydrogen produced by water reaction with residual sodium. The following table illustrates PCB destruction as a function of time using the above approach on a soil with an initial PCB content of 424 ppm (micrograms/gram):

| Sample | Treatment Time (minutes) Interval | Treatment Time (minutes) Total | PCB Content (mg/Kg) | % PCB Destruction |
|---|---|---|---|---|
| Untreated Soil | 0 | 0 | 424 | 0 |
| Sample 1 | 1 | 1 | 12.7 | 97.0 |
| Sample 2 | 2 | 3 | 8.4 | 98.0 |
| Sample 3 | 5 | 8 | 2.2 | 99.5 |

These results indicate that initially the rate of PCB destruction is extremely high, but extended time at temperature with excess sodium is required to achieve low soil residual PCB values.

EXAMPLE 3

One-Stage Flow-through Treatment of Soil in Two Vessels with Probe Sonication

To investigate scale-up of the technology, a test system was constructed as follows (shown in FIG. 3):
a slurry reservoir/recirculation tank 46 24 inches in diameter and 6 feet high was constructed of schedule 80 steel pipe and plate, and mounted on legs to permit heating of the tank bottom plate by a gas burner;
a 10 HP vertical sump pump 48 was installed in the recirculation tank;
a reaction chamber 44 18 inches in diameter and 3 feet high with a 45° cone bottom was fabricated with 2 side overflow pipe stubs 45 (normal and high level);
the reaction chamber 44 was mounted on an angle iron frame adjacent to the circulation tank 46 and the overflow ports 45 were connected by 4" diameter nitrile rubber hoses to corresponding pipe stubs on the circulation tank 46;
the 5 kW vertical sonic generator 40 was mounted on the top of the reaction tank 44 so that vibrating probe 42 would be 50% immersed when overflowing through the lower overflow pipe and 75% immersed when discharging through the high level overflow;
This system illustrated in FIG. 3 permitted circulation of slurry 50 through the sonically agitated reaction tank 44 from a relatively large reservoir of process slurry 46.
A new bulk sample from the fill described in Example 1 was obtained and processed in the same manner to prepare 33 Kg of soil for testing.
The test was then concluded as follows:
200 L (55 gallon drum) of kerosene was loaded into the reservoir by pump
the sump pump was started and its speed adjusted to circulate fluid at 500 L/min (+/−10%)
33 Kg of soil was loaded into the recirculation tank
the slurry was indirectly heated (while circulating) by propane burners directed at the bottom and sides of the tank
when the temperature of the circulating slurry reached 105° C., a sample was taken to determine the extent of extraction of PCB from the soil prior to starting the PCB destruction (time=0)
1.5 Kg of sodium metal was added as blocks to the circulation tank, and the 5 kW generator was turned on
samples of the circulating slurry were then taken over a period of 105 minutes of extraction/reaction. Samples were taken from a drain valve on the pump tank into a steel bucket; drainable hydrocarbon containing liquid (i.e. kerosene plus PCB contaminant extract) was returned to the tank by decantation and solid soil samples (with 15–17% kerosene content) were transferred to sealable glass sample containers for transport to the analytical laboratory.

Results of soil analyses were as follows:

| Sample | Sonic Treatment Time (minutes) Interval | Sonic Treatment Time (minutes) Total | Soil PCB Content mg/Kg |
|---|---|---|---|
| Feed Soil | None | None | 1043 |
| Slurry t = 0 | 0* | 0 | 217 |
| Slurry t = 5 | 5 | 5 | 104 |
| Slurry t = 38 | 33 | 38 | 85 |
| Slurry t = 60 | 22 | 60 | 23 |
| Slurry t = 105 | 45 | 105 | <2 |

*approximately 90 minutes of circulation during heating

Excess sodium remained in the slurry at the end of the 105 minute test. The new bulk untreated soil PCB content of 1043 ppm illustrates the heterogeneous nature of the landfill (compare to the previous sample containing 430–470 ppm) and the desirability of a blended feed for commercial operation.
The final soil PCB content<2 ppm confirms the practicality of treatment at a larger scale.

EXAMPLE 4

One-Stage Flow-through Treatment of Soil in Two Vessels with Axial Sonication

Following the successful flow-through test using the 5 kW generator, it was determined that commercial feasibility would be favored by use of the largest and highest powered Sonic Generator manufactured to date, the 75 kW horizontal unit. This unit also has the advantage of proven reliability, having operated for 6 months in a mine environment with minimal maintenance.
With reference to FIG. 4 the pilot test system was altered by:
Changing the pump/pipe configuration to feed (see below) a new reaction chamber 62 mounted on the 75 kW generator 60. The reaction chamber feed and discharge lines 64, 66 are axial entry/exit;
The schedule 40 steel pump discharge and return lines 64, 66 are isolated from the generator vibration by 4' lengths of nitrile hose 67, with secondary confinement (in the event of fatigue failure) by a light gauge nitrile rubber tube;
Design and manufacture of a new reaction chamber 62 to minimize short circuiting and maximize mixing intensity.
A new bulk 0.8 ton sample was also obtained from the site described in Example 1 and processed in the same manner to provide a uniform feed for tests to investigate a variety of operating parameters. After shakedown tests to confirm mechanical operability, the initial test on the 75 kW generator was performed as follows:
Load 200 L of kerosene into the pump tank
With the circulation pump on, load 44 Kg of soil into the pump tank
Heat the circulating mixture to 105° C. using gas fired torches on the bottom and sides of the circulation tank
Sample oil phase for PCB content (Sample #1)
Start generator at 105 Hz/10 kW Power setting (nominal Time=0 minutes)
Shut down to repair chamber leaks (mixing time approximately 2 minutes) sample from tank drain valve (sample #2)

reheat slurry with circulation and sonication at 105 Hz, 10–11 kW Power (45 minutes to heat from 4° C. to 110° C.)
sample #3 at 110° C.
Add 125 g sodium metal (1 block) to pump tank
Sample #4 after 30 minutes
Add 125 g sodium (1 block)
Sonicate for 15 minutes.
Add 250 g sodium (2 blocks)
Sample #5, 30 minutes after sodium addition
Add 125 g sodium (1 block)
Sample #6, 30 minutes after sodium addition
Add 125 g sodium (1 block)
Sample #7, 30 after sodium addition
Add 125 g sodium (1 block)
Sample #8, 30 minutes after sodium addition
Add 125 g sodium (1 block)
Sample #9, 30 minutes after sodium addition
Add 125 g sodium (1 block)
Sample #10, 30 minutes after sodium addition. (This sample was for hydrocarbon containing liquid phase plus approximately 4 Kg/2 L of soil solids for hydrocarbon containing liquid—soil separation testing.)

Results of hydrocarbon containing liquid phase analysis were as follows:

| Sample No. | Solid Phase PCB Content mg/Kg | Hydrocarbon Containing Liquid Phase PCB mg/L | Notes |
|---|---|---|---|
| Feed solids | 525 | — | 1.36% Moisture |
| 1 | | 180 | PCB extraction during heating cycle to 105° C. |
| 2 | | 191 | approx. 2 minutes of sonication before shutdown for mechanical problem |
| 3 | | 247 | after reheat to 110° C. approx. 45 minutes with sonication |
| 4 | | 215 | after 125 g sodium addition, 30 minutes sonication at 110–112° C., no excess sodium |
| 5 | | 127 | after 250 g sodium addition, 30 minutes sonication at 110–112° C., no excess sodium |
| 6 | | 114 | after 125 g sodium addition, 30 minutes sonication |
| 7 | | 90 | after 125 g sodium addition, 30 minutes sonication |
| 8 | | 61 | after 125 g sodium addition, 30 minutes sonication |
| 9 | | 44 | after 125 g sodium addition, 30 minutes sonication |
| 10 | | 39 | after 125 g sodium addition, 30 minutes sonication (apparent slight sodium residual) |

These results indicate the feasibility of PCB reduction by sodium addition to slurry using the 75 kW generator. The results also indicate that the chemical efficiency of the sodium destruction of PCBs decreases as the hydrocarbon containing liquid phase PCB concentration is decreased below (about) 125 mg/L.

EXAMPLE 5

Sonicated Hydrocarbon Containing Liquid-Soil Separation

As previously noted, clean soil recovered by decantation of hydrocarbon containing liquid after extraction and PCB destruction contains 15–17 wt % of hydrocarbon containing liquid phase. Recovery of this hydrocarbon containing liquid is important in relation to both process economics (cost of hydrocarbon containing extractant) and final disposal of the clean soil.

To investigate recovery of hydrocarbon containing liquid from treated soil (Example 4, Sample #10), an initial froth flotation test was conducted as follows:

Transfer 500 g of hydrocarbon containing, liquid saturated soil (sample#10 decanted) to a 2 L laboratory flotation cell Add 1.6 L of hot (60° C.) water and mix (condition) the soil—hydrocarbon containing liquid—water slurry for 2 minutes at 1500 rpm using a Denver D4 (Denver Equipment Co.) laboratory flotation machine Stop the agitator and—after 2 minutes of quiescent settling—decant the separated free floating hydrocarbon containing liquid phase Agitate (condition) for a further 2 minutes Add further hot water (approx 0.1 L) to bring the pulp (liquid-solid slurry) level within about 1 cm of the cell overflow With aeration controlled by the machine's air intake valve, manually remove froth for 35 minutes, periodically adjusting pulp volume with hot water to compensate for volume of froth removed until the froth was visually free of solids Stop agitation, settle 1 minute Decant water Record wet weight clean soil Sample wet soil for analysis Analysis of the clean soil indicated:

| Sample | Moisture % | PCB content (as received) mg/Kg | Oil & grease (as received) mg/Kg | Solids Recovery (wt % of feed, dry basis) | Hydrocarbon Containing Liquid Recovery (%) |
|---|---|---|---|---|---|
| Clean Soil (flotation tailing) | 14.6 | 1.7 | 1800 | 96 | >98 |

These results indicate that froth flotation, a commonly practiced industrial process, is effective for recovery of hydrocarbon containing liquid from cleaned soil. It is of interest to note that the residual PCB content of the cleaned soil, although low enough to meet stringent disposal criteria, is higher than can be accounted for by its residual oil and grease content if it is assumed that the residual hydrocarbon containing liquid contains the same (39 mg/L) PCB content as the bulk hydrocarbon containing liquid separated from the solids at the end of the extraction/destruction test (Example 4, Sample 10).

These data also demonstrate that complete destruction of PCBs in the hydrocarbon containing liquid phase is not necessary in order to produce acceptably low PCBs content in cleaned soil for disposal. This is an important factor for process economics, since the results of the Example 4 indicate that the chemical efficiency of sodium destruction of PCBs decreases as the residual PCBs concentration is lowered and becomes prohibitively inefficient below (about) 60 ppm PCB.

EXAMPLE 6

Sonicated Hydrocarbon Containing Liquid-Soil Separation with Additives

The procedure followed in Example 5 was repeated with the following modifications:

The water additions were pre-heated to about 90° C.

A commercial frothing agent (Dowfroth 250, polyglycol, average molecular weight=250) was added incrementally to a total dosage of 20 g/tonne of feed solids to generate and maintain a better froth than was obtained in the initial tests to which no chemical was added.

Pulp (liquid-solid slurry) pH was adjusted to 11.5 with sodium carbonate (0.5 Kg/tonne of feed).

Analysis of clean soil from this test indicated:

| Sample | PCB content mg/Kg | Oil & grease mg/Kg | Solids Recovery (wt % of feed dry basis) | Hydrocarbon Containing Liquid Recovery (%) |
| --- | --- | --- | --- | --- |
| Clean Soil (flotation tailing) | <1 | 421 | 95 | >99 |

These data confirm the utility of froth flotation for hydrocarbon containing liquid-soil separation and indicate that manipulation of conditions such as pH and frother dosage can be used to optimize the process.

EXAMPLE 7

Two-Stage Flow-through Treatment of Soil in Two Vessels with Hydrocarbon Containing Liquid Extractant Soils contain varying quantities of organic matter and other materials which may compete with PCBs for reaction with sodium containing alkali. To investigate the effect of separating the PCB extraction and destruction operations, the following test sequence was conducted:

150 L of used hydrocarbon containing liquid from the test of Example 4 was returned to the circulation tank with 45.7 Kg of PCB soil bulk sample.

This mixture was heated to 110–115° C. and treated through the 75 kW Sonic generator chamber for 3 hours at 105 Hz, 10–12 kW power. (Note: use of low power settings relative to the generator's 75 kW maximum was based on supplying a mixing power intensity similar to what would be achieved in the next stage of scale up. Using chambers on each end of the generator (e.g. see also FIG. 9A in U.S. Pat. No. 5,005,773) and increasing power to 75 kW will provide the same power input (kW/ton) to approximately 15× as much material, i.e. a batch size of 0.6–1 tonne. Larger batches can be treated at equivalent power input by extending treatment time or providing more generators.)

Hydrocarbon containing liquid phase samples from this test were analyzed, indicating:

| Sample No. | Sonic Treatment Time (minutes) | PCBs mg/L | Notes |
| --- | --- | --- | --- |
| 0 | 0 | 44 | Recycled hydrocarbon containing liquid |
| 1 | 15 | 190 | Extraction from 45 minutes heat up plus 15 minutes sonic treatment |
| 2 | 45 | 215 | |
| 3 | 135 | 213 | |
| 4 | 195 | 219 | |

Since the precision of PCB analytical results is typically +/−10%, these data indicate substantially complete reaction within 45 minutes and >90% extraction within the heating time+15 minutes of sonication.

The reacted slurry was drained from the circulation tank and primary hydrocarbon containing liquid-soil separation was performed by manual decantation. Recovered hydrocarbon containing liquid, 140 L, was returned to the circulation tank along with 60 L of used hydrocarbon containing liquid accumulated from other tests. The combined hydrocarbon containing liquid sample was then heated to 110° C. under a nitrogen purge gas flow and pumped through the generator chamber (10–11 kW, 105 Hz) while adding increments of sodium metal.

Test analytical results were as follows:

| Sample No. | PCB (mg/L) | Sodium addition (g) interval | Sodium addition (g) cumulative | Notes |
| --- | --- | --- | --- | --- |
| 1 | 271 | 0 | 0 | Blended hydrocarbon containing liquid |
| 2 | 177 | 200 | 200 | |
| 3 | 90 | 200 | 400 | |
| 4 | 45 | 200 | 600 | |

These data show the same trend as results from Example 4, i.e. the chemical efficiency of sodium reduction of PCBs decreases as the residual PCB decreases, particularly below 100 ppm. However, the overall sodium efficiency for this test is approximately 28% improved relative to results of Example 4.

Since the cost of sodium metal (Canadian Dollars $3/lb in bulk) is estimated to be the largest single component of treatment operating cost, hydrocarbon containing liquid—soil separation before sodium treatment may thus be a preferred option for process operation on soils with a high parasitic sodium consumption.

EXAMPLE 8

Two-Stage Flow-through Treatment of Soil in Two Vessels with Hydrocarbon Containing Liquid/Water Extractant Since the sodium containing alkali efficiency is better at higher PCB concentrations in the hydrocarbon containing liquid extractant, consideration was given to conducting the sonic extraction with a fluid mixture of water and hydrocarbon containing liquid to achieve a higher PCB concentration in the hydrocarbon containing liquid phase. It was also hypothesized that water soluble and more hydrophilic components of the soil (probable contributors to parasitic sodium consumption) might be retained in the aqueous phase.

A laboratory scale scoping test provided encouraging results (1700 mg/L PCB in the hydrocarbon containing liquid phase), so a pilot scale test was conducted as follows:
load 110 L of water and 20 L of kerosene to the circulation tank
heat mixture to 92° C. while circulating with the pump
load 46.3 Kg of bulk soil sample
sample (hydrocarbon containing liquid i.e. kerosene rich phase) set generator to 10–11 kW for intensive mixing of circulating slurry
at 120 minutes, sample circulating slurry for hydrocarbon containing liquid phase analysis and soil cleanup testing (see below)

Results of hydrocarbon containing liquid phase analyses were as follows:

| Sample No. | Sonic Extraction Time (minutes) | PCB Content mg/L | Notes |
|---|---|---|---|
| 1 | 0 | 1616 | hot pump circulation |
| 2 | 120 | 1747 | Sonication |

These results confirm the practicality of obtaining a high hydrocarbon containing liquid phase PCB content by extraction of soil with a water-hydrocarbon containing liquid fluid mixture.

To assess final soil cleanup, the 120 minute slurry sample was treated as follows:
decant fluid hydrocarbon containing liquid and water phases from settled solids
heat the fluid phase mixture to 90° C.
transfer to a separatory funnel and decant the aqueous (sink) phase
transfer 500 g of soil solids (saturated) to the flotation test apparatus described in Example 5
add aqueous phase from the water-hydrocarbon containing liquid separation (approximately 1.75 L) to the cell to permit froth overflow
condition (mix) for 2 minutes, then float for 30 minutes. (Solution pH 11.7 throughout test; initial froth quality was poor, but it improved throughout the test)
shut down flotation and decant remaining water
record soil wet weight
air dry soil overnight, record dry weight
submit soil sample for PCB analyses Cleaned soil parameters were as follows:

| | |
|---|---|
| Wet Weight (from 500 g wet feed) | 395 g (~80% recovery) |
| Dry Weight | 335 g |
| Dry basis PCB content | 48 mg/Kg |

These results demonstrate the practicality of recovering >90% of soil PCB content in a single stage of water-hydrocarbon containing liquid extraction to produce hydrocarbon containing liquid phase PCB contents in the 1750 mg range. The PCB content of the cleaned soil was marginal with respect to applicable disposal criteria (maximum 50 ppm PCBs for secure landfill disposal vs. incineration or other PCB destruction technology required for waste>50 ppm PCB). Thus a second counter-current stage of extraction with low PCB hydrocarbon containing liquid will be required with the water-hydrocarbon containing liquid sonication.

Hydrocarbon containing liquid phase from the water-hydrocarbon containing liquid decantation was transferred to a laboratory (low intensity) mixing system, heated to 110–115° C. and treated with incremental doses of granular (3×0.1 mm) sodium to investigate the efficiency of sodium PCB reaction using the high PCB hydrocarbon containing liquid extract, with the following results:

| Sample No. | PCB (mg/L) | Sodium Dose (g/L) interval | Cumulative | Notes |
|---|---|---|---|---|
| 1 | 1832 | 0 | 0 | Concentration increase from 1747 due to evaporation |
| 2 | 126 | 2.6 | 2.6 | Apparent high sodium efficiency |
| 3 | 34 | 2.6 | 5.2 | Efficiency loss at low PCB |

These data indicate a significant improvement in sodium efficiency compared to the results of Example 7. For PCB reduction from 1832 to 126 mg/L (93% destruction) the sodium consumption was only 5 times the stoichiometric requirement, compared to 30 times to reach 45 mg/Kg in Example 7. For reduction of PCB from 126 to 34 mg/L, the stoichiometric excess sodium requirement increases to about 87 times, which clearly indicates the desirability (in terms of sodium efficiency) of high PCB content hydrocarbon containing liquid phase extract. However, the overall efficiency in this example (from 1832 to 34 mg/L) is about 10× stoichiometric, which is a very significant improvement over the 30× stoichiometric requirement in Example 7.

EXAMPLE 9

Extraction and Destruction of PCBs from Electrical Ballasts

A sample of concentrated ballast tar was obtained from Contech Ltd. Richmond, BC. Contech is a firm, which uses proprietary technology (low temperature attrition scrubbing) to recover metal components from scrap PCB ballasts. The metal fraction, containing typically<40 mg/Kg of PCBs is sold to a copper recycling operation. The separated tarry (high PCB) fraction, with residual metallics, paper, and debris, is shipped to licensed hazardous waste incinerator operators in Alberta for destruction.

The ballast tar sample provided (11.1 Kg, approx. 18 L volume, i.e. low bulk density) was processed initially in the pilot system as follows:

- transfer 100 L of fresh kerosene and 11.1 Kg ballast tar to circulation tank and heat to 105° C. while circulating with the pump (2 h contact time at T>60° C.)
- start inert gas flow and sonic generator at 10 kW
- after 15 minutes of sonic extraction, take baseline sample for hydrocarbon containing liquid phase PCB and commence incremental sodium addition.

The initial phase of the test was shut down after 165 minutes of sonication for two reasons: high sodium demand and visual observation of relatively large undispersed tar particles. A review of literature on ballast components was undertaken and this revealed that the air-blown asphalt component contains a high proportion of phenolic (effectively acidic) materials.

The test system was then re-started and 150 g each of coarse and fine quick lime (calcium oxide) was added to neutralize acidic (sodium consuming) components of the mixture. The sample was then treated for a further 270 minutes with sonication and incremental sodium addition.

Test data are summarized as follows:

| Sample No. | PCB solids (mg/Kg) | Hydrocarbon containing liquid mg/L | Sodium Addition Interval | Sodium Addition cumulative | Notes |
|---|---|---|---|---|---|
| Ballast Tar | 1200 | • | • | • | ±20% due to heterogeneous sample |
| #1 | • | 112 | 0 | 0 | |
| #2 | • | 112 | 125 | 125 | |
| #3 | • | 105 | 0 | 125 | |
| #4 | 60 | 97 | 150 | 275 | |
| #5 | 43 | 92 | 0 | 275 | |
| | | Shutdown after 270 minutes | | | |
| | | Restart with 30 Kg/ton lime addition | | | |
| 1A | • | 106 | 0 | 275 | Note increased extraction in heat up |
| 2A | • | 9 | 125 | 400 | Apparent major improvement in sodium efficiency |
| 3A | • | 6 | 125 | 525 | |
| 4A | • | 8 | 0 | 525 | |
| 5A | 4 | 7 | 0 | 525 | |

These data confirm the practicality of treating ballast tar in kerosene by sonication and sodium PCB reduction, as well as indicating a favourable effect of quicklime addition in relation to sodium efficiency.

The time (270 minutes) of hot sonication required to achieve 43 ppm residue PCB content indicates the difficult (relative to soil) extraction behaviour of ballast tar. However, this could be mitigated by comminution of the feed material, which was relatively coarse (~10%+¼").

EXAMPLE 10

Confirmation Test—Sodium Efficiency Improved by Lime Addition

A further test was done according to the procedure of Example 9 with the following adjustments:

- A new ballast sample was used and tar content of the feed was increased to 29 Kg/100 L of kerosene
- Sonic mixing time before sodium addition was increased to 9 hours
- Lime (50 g/Kg of tar) was added to the tar-kerosene slurry after 8 h of mixing (i.e. 1 h before the first sodium addition)
- Sodium was added incrementally in two 1.0 g/L (100 g/100 L hydrocarbon containing liquid phase) doses, allowing 2 h of mixing time between sodium addition and subsequent sampling to ensure complete reaction Analytical results are summarized as follows:

| Sample No. | PCB Solids (mg/L) | PCB Liquid (mg/L) | Sodium Dose (g/100 L) Interval | Sodium Dose (g/100 L) Cumulative | Notes |
|---|---|---|---|---|---|
| Ballast Tar | 1760 | — | — | — | +/-20% due to heterogeneous sample |

-continued

| Sample No. | PCB Solids (mg/L) | PCB Liquid (mg/L) | Sodium Dose (g/100 L) Interval | Sodium Dose (g/100 L) Cumulative | Notes |
|---|---|---|---|---|---|
| 1, Liquid Extract | — | 510 | 0 | 0 | |
| 2, First Reduction | — | 180 | 100 | 100 | Large increase in initial sodium efficiency |
| 3, Second reduction | — | 57 | 100 | 200 | Equivalent to Example 9, Samples 1A & 2A |

The initial hydrocarbon extract PCB content in the test was higher than for Example 9 due to the higher ratio (29 Kg/100 L vs. 11.1 Kg in Example 9) and also to the higher PCB content (1760 mg/Kg) of the new sample.

The effect of the lime addition on the initial sodium efficiency in this test is illustrated by comparing the change in hydrocarbon PCB content for Example 9 between Sample #1 and #5 (PCB reduced from 112 to 92 mg/L after addition of 275 g sodium/100 L of extract) with the 510 to 180 mg/L PCB reduction after addition of 100 g sodium/100 L in the current test with lime added before any sodium addition. The initial sodium efficiency in this test is approximately 60 times greater than in Example 9 (before lime addition).

For the second sodium treatment in the current example, the reduction in PCB content (Sample 3–2; 150–57=123 mg/L for a 100 g/100 L sodium addition) compares favourably to the second phase of Example 9 (Sample 2A vs. 1A; 106–9=97 mg/L for a 125 g/100 L sodium addition). However, the sodium efficiency ratio between this example (samples 2 and 3) and Example 9 (samples 1A and 2A) is only 1.6. Considering the previously noted trend to lower sodium efficiency at lower PCB concentrations, these results are considered to be equivalent.

Overall, results of this example confirm the favourable effect of lime addition on sodium efficiency on treatment of ballast tar by hydrocarbon PCB extraction/sodium PCB destruction.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

We claim:

1. A method for treating polychlorinated biphenyl (PCB) contaminated media comprising the steps of:
   a) combining said media with a fluid containing one or more liquid hydrocarbons to form a media/fluid mixture;
   b) sonicating said mixture at audio frequency to extract PCB from the media into the fluid; and
   c) treating said fluid with molten sodium-containing alkali metal.

2. The method of claim 1 wherein said treatment step takes place during said sonication step and said sonication step occurs at a temperature sufficient to melt said sodium-containing alkali metal.

3. The method of claim 2 wherein said sonication step occurs in a vessel with one or more inlets and outlets able to transfer said media/fluid mixture between said vessel and a pump-equipped reservoir.

4. The method of claim 3 further including the step of decanting said sonicated media/fluid mixture to separate sonicated fluid and sonicated media.

5. The method of claim 4 including the additional step of treating said separated sonicated media with water in a flotation cell to dislodge residual PCB-containing hydrocarbon liquid and froth from said separated sonicated media.

6. The method of claim 5 wherein said flotation cell treated media is recycled to the environment.

7. The method of claim 5 wherein said froth is recycled and used as part of said fluid in said method.

8. The method of claim 5 wherein said flotation cell includes a frothing agent.

9. The method of claim 5 wherein said flotation cell includes pH adjustment with sodium carbonate.

10. The method of claim 4 including an additional step of sonicating said separated sonicated fluid in the presence of sodium containing alkali metal and at a temperature sufficient to melt sodium containing alkali metal.

11. The method of claim 10 wherein said treated separated sonicated fluid is recycled for use as said fluid in said method.

12. The method of claim 3 wherein said sonication step further includes using inert gas to purge the head space of said reservoir and said vessel.

13. The method of claim 2 wherein said sonication step occurs in a sealed vessel with a vent to release gas during sonication.

14. The method of claim 1 wherein said sonication step includes the addition of lime to said mixture.

15. The method of claim 14 wherein said sonication step is repeated using lime-sonicated media and a sodium-containing alkali metal at a temperature sufficient to melt sodium.

16. The method of claim 15 wherein said sonication steps occur in a sealed vessel able to be vented to release gas during sonication.

17. The method of claim 1 wherein said media is ballast residue.

18. The method according to claim 17, wherein said sonicating step occurs at a temperature greater than 98° C.

19. The method of claim 1 wherein said fluid contains a mixture of water and one or more liquid hydrocarbons.

20. The method of claim 19, wherein said sonicating step occurs in a temperature range of 80–98° C.

21. The method of claim 1 including the additional steps of heating said media/fluid mixture prior to and during said sonicating step.

22. The method of claim 1 wherein said media is soil.

23. The method of claim 1 wherein said liquid hydrocarbons include kerosene.

24. The method of claim 1 including the additional step of reducing the particle size of said media prior to said combining step, said reducing step being one or more of sieving, comminuting and pulverizing said media.

25. The method of claim 1 including the additional step of air-drying said media prior to said combining step.

26. The method of claim 1 wherein said sonicating step uses sonication equipment without grinding media.

27. The method of claim 1, wherein said sonicating step occurs at a temperature greater than 98° C.

28. The method of claim 1, wherein said sonicating step uses a resonating probe contacting said mixture.

29. The method of claim 1, wherein said sonicating step takes place in one or more chambers mounted axially to a resonating member.

30. The method according to claim 1, wherein said sodium-containing alkali metal is sodium.

31. An apparatus for treating polychlorinated biphenyl (PCB) contaminated media, comprising:
   a) a reaction vessel for holding a mixture of said media, a liquid hydrocarbon-containing fluid, and a molten sodium-containing alkali metal, said reaction vessel having vents to release gas during sonication;
   b) an audio frequency sonicator without grinding media for sonicating said mixture at an audio frequency; and
   c) a heater for controlling the temperature of said mixture and maintaining said molten sodium-containing alkali metal in a molten state, said heater having an operating range with an upper limit at least equal to a temperature of molten sodium.

32. The apparatus of claim 31, wherein said sonicator uses a resonating probe contacting said mixture.

33. The apparatus of claim 31, wherein said reaction vessel consists of one or more chambers mounted axially to a resonating member of said sonicator.

* * * * *